(12) United States Patent
Koishi

(10) Patent No.: US 6,501,622 B2
(45) Date of Patent: Dec. 31, 2002

(54) HEAD SLIDER CAPABLE OF IMPROVING SHOCK RESISTANCE OF RECORDING DISK DRIVE

(75) Inventor: Ryosuke Koishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/404,914

(22) Filed: Sep. 24, 1999

(65) Prior Publication Data

US 2002/0075601 A1 Jun. 20, 2002

(30) Foreign Application Priority Data

Apr. 19, 1999 (JP) .......................................... 11-110261

(51) Int. Cl.$^7$ .............................. G11B 5/60; G11B 15/64
(52) U.S. Cl. .................................. 360/236.6; 360/236.7
(58) Field of Search .............................. 360/236.3, 237, 360/235.3, 235.4, 236.6, 236.7

(56) References Cited

U.S. PATENT DOCUMENTS 5,095,613 A * 3/1992 Hussinger et al. ......... 29/603.1
5,997,755 A * 12/1999 Sawada ....................... 216/22

* cited by examiner

Primary Examiner—David Davis
(74) Attorney, Agent, or Firm—Greer, Burns & Crain, Ltd.

(57) ABSTRACT

A head slider, usually employed in a recording disk drive, comprises a chamfered vertex defined at a corner of a polygonal bottom surface surrounded by a contour separated from a contour of an air bearing surface. Even when the chamfered vertex collides with the surface of a recording disk, a scratch or damage may be hardly generated on the surface of the recording disk, as compared with a keen vertex. The recording disk drive employing the head slider may enjoy an improved shock resistance.

14 Claims, 5 Drawing Sheets

HEAD SLIDER CAPABLE OF IMPROVING SHOCK RESISTANCE OF RECORDING DISK DRIVE

BACKGROUND OF THE INVENTION

1. Field of the Invention

The present invention relates to a head slider usually employed in a recording disk drive such as a magnetic disk drive.

2. Description of the Prior Art

A magnetic disk drive such as a hard disk drive (HDD) often employs a flying head slider. The flying head slider is adapted to fly above the surface of a magnetic disk by receiving air stream generated along the surface of the rotating magnetic disk. A transducer element embedded in the flying head slider achieves read/write operations without contacting the surface of the magnetic disk.

If a larger impact is applied to the HDD during read/write operations of the transducer element, the flying head slider collides against the magnetic disk. Even when the flying head slider is seated on the surface of the stationary magnetic disk, a larger impact applied to the HDD causes the flying head slider to bound on the surface of the magnetic disk. In any of these cases, the surface of the magnetic disk may be scratched or damaged by collision of the flying head slider.

Recently, many portable electronic devices, such as notebook-type personal computers and personal digital assistants have emerged. When recording disk drives are assembled in such portable electronic devices, a higher shock resistance is required as compared with general desktop-type or stationary electronic devices. It is preferable to avoid the surface of a recording disk from suffering from a scratch or damage even when a user drops the electronic device.

SUMMARY OF THE INVENITON

It is accordingly an object of the present invention to provide a head slider capable of contributing to improvement in shock resistance of a recording disk drive.

According to the present invention, there is provided a head slider for recording disk, comprising a chamfered vertex defined at a corner of a polygonal bottom surface surrounded by a contour separated from a contour of an air bearing surface.

In general, keen vertices are shaped at corners of the polygonal bottom surface of the head slider. It is observed that the keen vertex makes a scratch or damage on the surface of the recording disk when colliding against the surface of the recording disk. The chamfer serves to round the keen vertex, so that a scratch or damage can be restrained on the surface of the recording disk even when the head slider collides against the surface of the recording disk.

The bottom surface may comprise at least a rail swelling from a level surface of the bottom surface. In this case, a keen vertex is made at a corner of the polygonal level surface. The chamfer serves to round the keen vertex at the level surface, so that a scratch or damage can be restrained on the surface of the recording disk even when the head slider collides against the surface of the recording disk.

The chamfered vertex may be formed on a column standing on the level surface at the corner. Since the column defines a longer edge, it is possible to largely chamfer a vertex along the longer edge. The keen vertex may be largely rounded. Accordingly, a scratch or damage can reliably be restrained on the surface of the recording disk even when the head slider collides against the surface of the recording disk.

The column preferably includes a tip end aligned with the top surface of the rail. If the height of the column is aligned with the top surface of the rail in this manner, the column can normally be formed without introducing any additional process. The column can be formed at the same time in the process of forming the rail, for example.

The rail may define an air bearing surface connected to a top surface of the rail through a step formed at least at a downstream end. When air stream flows along the top surface of the rail and the step to the air bearing surface, a larger positive pressure or lift can be generated at the air bearing surface so as to keep the head slider above the surface of the recording disk.

In this case, the rail preferably comprises a front rail extending in a lateral direction of the slider near an upstream end of the slider, and a pair of rear rails spaced apart in the lateral direction near a downstream end of the slider for defining a passage of air stream therebetween. When air stream flows into a space behind the front rail in this head slider, a negative pressure can be generated between the bottom surface and the surface of the recording disk. The generated negative pressure is balanced with the positive pressure or lift at the air bearing surface so as to regulate the flying height of the head slider above the surface of the recording disk. Moreover, a pair of the rear rails serve to stabilize the behavior of the head slider in the lateral direction.

The head slider of the aforementioned type may comprise the column integrated with the front rail at its opposite ends in the lateral direction of the slider. In addition, the column may be integrated with the rear rail at one of opposite ends in the lateral direction of the slider. Such integration serves to reinforce the rigidity of the column. Moreover, if the tip end of the column is aligned with the top surfaces of the front and rear rails, the column can normally be formed without introducing any additional process. At the same time, the chamfer made on the column is prevented from affecting on the flying height of the head slider above the surface of the recording disk.

A magnetic head slider, as an example of the aforementioned head slider, can be produced by the method comprising: forming rows of transducer elements on a surface of a wafer; cutting a wafer bar out of the wafer to separate a row of transducer elements out of the rows; shaping an exposed section of the wafer bar into a bottom of a head slider for each of the transducers; and lapping the bottom of the head slider which has been cut off from the wafer bar. When the lapping process is applied to the individual head slider after separation, the keen vertices at corners of the polygonal bottom surface can reliably be chamfered.

The bottom is preferably urged against an abrasive layer spread over an elastic surface in lapping the bottom. When the bottom of the individual head slider is rubbed on the abrasive layer, the abrasive layer is deformed due to the elasticity of the elastic surface so as to contact with the periphery of the bottom of the individual head slider. The elastic deformation of the abrasive layer serves to reliably chamfer the vertices of the polygonal bottom. It is confirmed that this lapping process surely achieves the chamfer at corners of the level surface even when the rail swells on the level surface.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
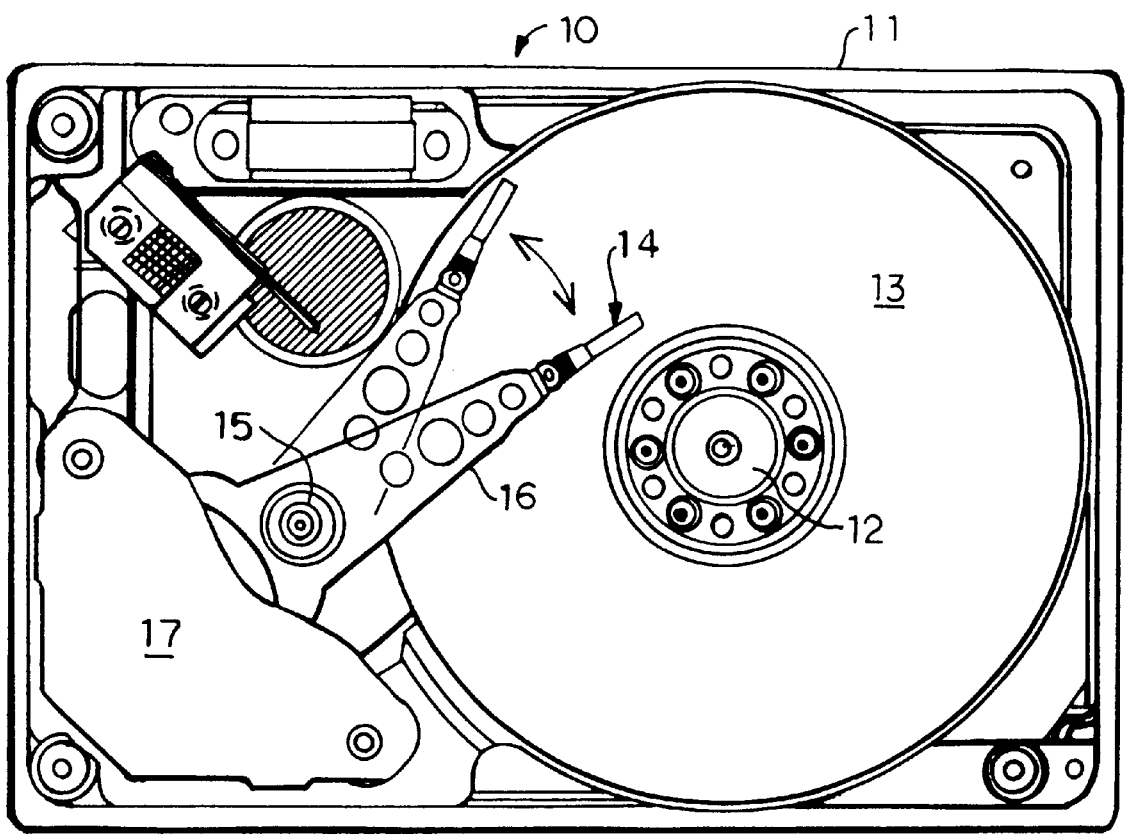
FIG. 1 is a plan view schematically illustrating the interior structure of a hard disk drive (HDD)

FIG. 1 illustrates an interior structure of a hard disk drive (HDD) 10 as an example of a magnetic disk drive. The HDD 10 comprises a housing 11 accommodating magnetic disks 13 mounted on a spindle motor 12 and flying head sliders 14 opposed to the respective surfaces of the magnetic disks 13. The flying head sliders 14 are supported at the tip ends of a carriage arm 16 capable of swinging about a support axis 15. When information is read out of or written into the magnetic disk 13, the carriage arm 16 is driven to swing with the assistance of the power from an actuator 17 comprising a magnetic circuit, so that the flying head slider 14 moves in the radial direction of the magnetic disk 13. Such radial movement allows the flying head slider 14 to be positioned above a target recording track on the magnetic disk 13. The interior space within the housing 11 may be closed with a cover, not shown.

Figure 2:
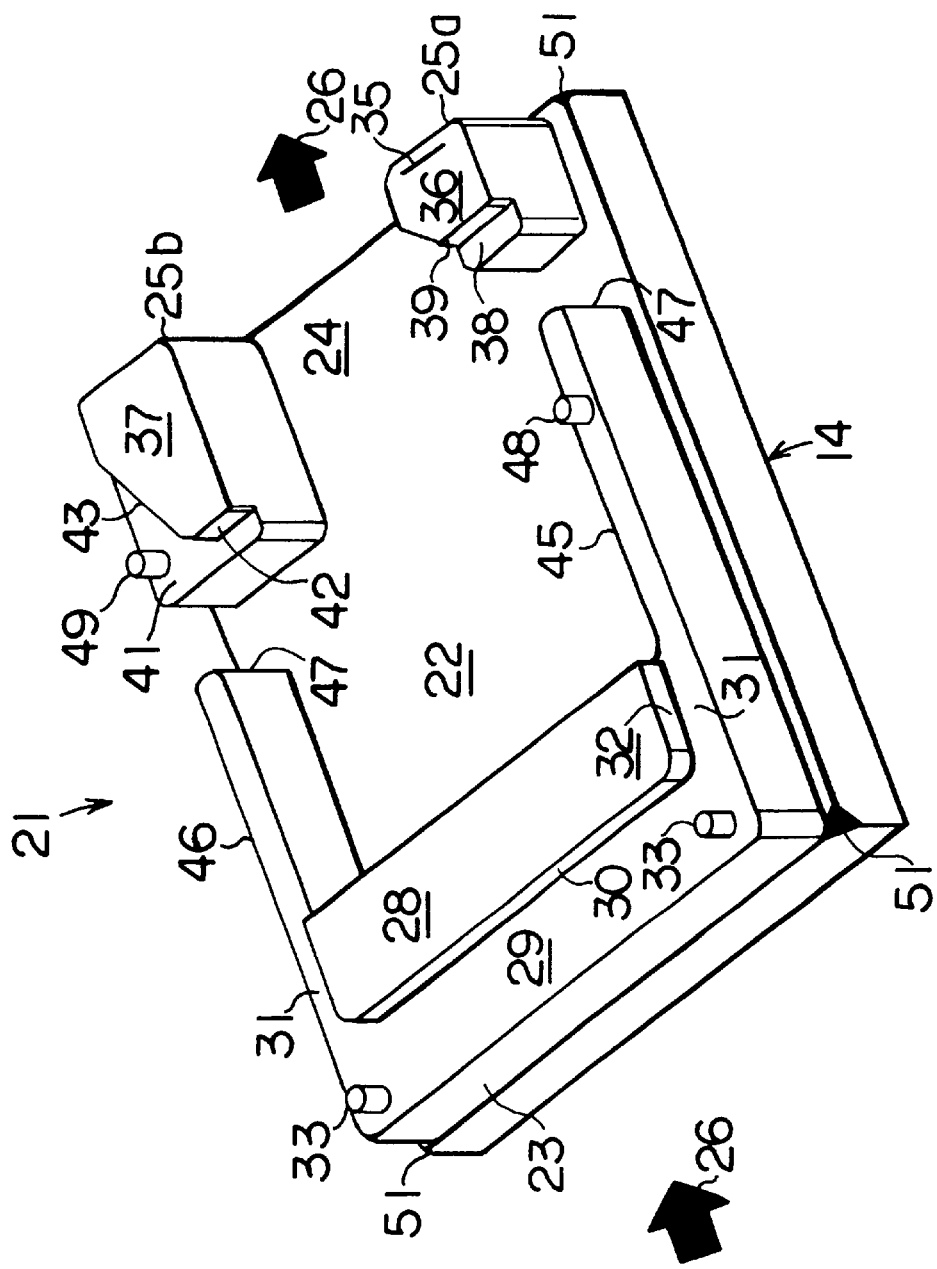
FIG. 2 is an enlarged perspective view illustrating a flying head slider according to a first embodiment of the present invention.

FIG. 2 illustrates the flying head slider according to a first embodiment of the present invention. The flying head slider 14 comprises a polygonal or quadrilateral bottom surface 21 opposed to the surface of the magnetic disk 13. The bottom surface 21 comprises a front rail 23 swelling from the level surface 22 so as to extend in the lateral direction of the slider 14 near the upstream end of the slider 14, and a pair of rear rails 25a, 25b, both swelling from the level surface 22, spaced apart each other in the lateral direction of the slider 14 near the downstream end of the slider 14. A passage 24 is defined between the rear rails 25a, 25b for air stream. When the magnetic disk 13 rotates, an air stream 26 generated along the surface of the magnetic disk 13 flows along the bottom surface 21 from the upstream end to the downstream end.

A front air bearing surface 28 is defined on the top surface of the front rail 23 so as to extend in the lateral direction of the slider 14. When the magnetic disk 13 rotates to generate the air stream 26 along its surface, the air stream 26 is received by the front air bearing surface 28. A lift is generated at the front air bearing surface 28 so as to keep the flying head slider 14 above the surface of the magnetic disk 13.

A front stepped surface 29 is formed upstream of the front air bearing surface 28. A front wall 30 is connected to the front stepped surface 29 so as to extend from the upstream end of the front air bearing surface 28 toward the level surface 22. Side stepped surfaces 31 are likewise formed adjacent the front air bearing surface 28 on opposite sides thereof in the lateral direction of the slider 14. The side stepped surfaces 31 are connected to the front stepped surface 29 so as to make a flat surface. Side walls 32 are respectively connected to the side stepped surfaces 31 so as to extend toward the level surface 22 from an edge extending downstream along the contour of the front air bearing surface 28 from the upstream end. When the magnetic disk 13 rotates, air stream flows along the front stepped surface 29 and the front wall 30 to the front air bearing surface 28 so as to generate a larger positive pressure or lift at the front air bearing surface 28.

A pair of protrusions or adsorption prevention pads 33 are formed at corners of the front stepped surface 29 to have tip ends lower than the level of the front air bearing surface 29. The adsorption prevention pads 33 serve to avoid the front air bearing surface 28 from contacting the surface of the magnetic disk 13 when the flying head slider 14 is seated on the surface of the magnetic disk 13.

A first rear air bearing surface 36 is defined on the top surface of the rear rail 25a. A transducer element 35 is embedded in the first rear air bearing surface 36. A second rear air bearing surface 37 is likewise defined on the top surface of the rear rail 25b. When the magnetic disk 13 rotates to generate the air stream 26 along its surface, the air stream 26 is received by the first and second rear air bearing surfaces 36, 37. A lift is generated at the first and second rear air bearing surfaces 36, 37 so as to keep the flying head slider 14 above the surface of the magnetic disk 13.

A front stepped surface 38 is formed upstream of the first rear air bearing surface 36. A front wall 39 is connected to the front stepped surface 38 so as to extend from the upstream end of the first rear air bearing surface 36 toward the level surface 22. When the magnetic disk 13 rotates, air stream flows along the front stepped surface 38 and the front wall 39 to the first rear air bearing surface 36 so as to generate a larger positive pressure or lift at the first rear air bearing surface 36.

A front stepped surface 41 is formed upstream of the second rear air bearing surface 37. A front wall 42 is connected to the front stepped surface 41 so as to extend from the upstream end of the second rear air bearing surface 37 toward the level surface 22. A recess 43 is defined at a corner of the second rear air bearing surface 37, so that the front stepped surface 41 broadens upstream. When the magnetic disk 13 rotates, air stream flows along the front stepped surface 41 and the front wall 42 to the second rear air bearing surface 37 so as to generate a larger positive pressure or lift at the second rear air bearing surface 37.

Here, the total positive pressure or lift at the first and second rear air bearing surfaces 36, 37 is set smaller than the positive pressure or lift generated at the aforementioned front air bearing surface 28. The bottom surface 21 consequently approaches closer to the surface of the magnetic disk 13 at downstream end than at the upstream end during flight of the flying head slider 14.

Moreover, the positive pressure or lift at the second rear air bearing surface 37 is set larger than the positive pressure or lift at the first rear air bearing surface 36. The first rear air bearing surface 36 consequently gets closer, near the downstream end closer to the surface of the magnetic disk 13, to the surface of the magnetic disk 13 than the second rear air bearing surface 37 during flight of the flying head slider 14. The flying head slider 14 accordingly allows the region around the transducer element 35 to approach closest to the surface of the magnetic disk 13 during flight.

First and second side rails 45, 46 are respectively connected to the front rail 23 at its opposite ends in the lateral direction of the slider 14 so as to extend towards the rear rails 25a, 25b, namely, the first and second rear air bearing surfaces 36, 37. The side rails 45, 46 serve to prevent air stream, which flows around the lateral opposite ends of the front rail 23, from entering behind the front rail 23. Accordingly, when air stream flowing along the front air bearing surface 28 has passed the front rail 23, the air stream expands in the vertical direction to the surface of the magnetic disk 13 so as to generate a negative pressure. The generated negative pressure is balanced with the aforementioned positive pressure or lift to regulate the flying height of the flying head slider 14 above the surface of the magnetic disk 13. Notches 47 are defined between the side rails 45, 46 and the rear rails 25a, 25b, respectively, so as to introduce air stream flowing around the lateral opposite ends of the front rail 23 into the passage 24.

The top surfaces of the first and second side rails 45, 46 are connected to the front and side stepped surfaces 29, 31 of the front rail 23 so as to form a flat surface. In addition, a first rear protrusion or adsorption prevention pad 48 is formed on the top surface of the first side rail 45 so as to define the tip end lower than the level of the first rear air bearing surface 36. The adsorption prevention pads 48 serves to avoid the first rear air bearing surface 36 from contacting the surface of the magnetic disk 13 when the flying head slider 14 is seated on the surface of the magnetic disk 13. A second rear protrusion or adsorption prevention pad 49 is likewise formed on the front stepped surface 41 at the rear rail 25b so as to define the tip end lower than the level of the second rear air bearing surface 37. The adsorption prevention pads 49 serves to avoid the second rear air bearing surface 37 from contacting the surface of the magnetic disk 13 when the flying head slider 14 is seated on the surface of the magnetic disk 13.

Figure 3:
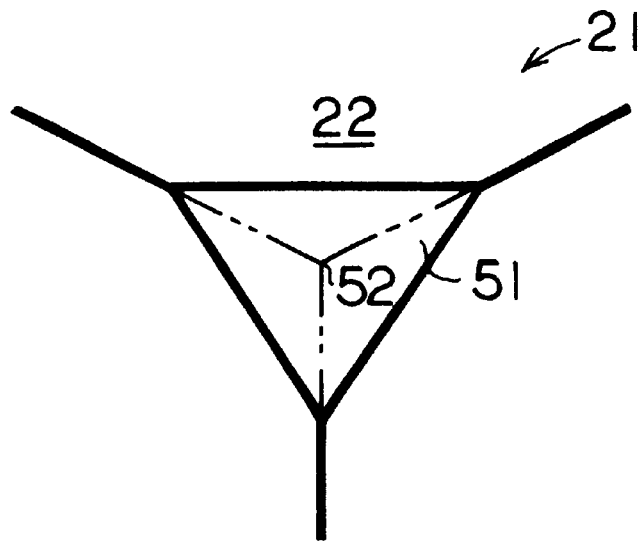
FIG. 3 is an enlarged perspective view illustrating a corner of the bottom surface.

The flying head slider 14 comprises slants 51 at four corners of the level surface 22. As shown in FIG. 3, when the bottom surface 21 is cut out into a polygonal shape, vertices 52 are formed at respective corners of the polygonal level surface 22. The chamfered vertices 52 define the slants 51.

The slants 51 serve to round the keen vertices 52. It has been confirmed that the chamfered vertices or slants 51 serve to restrain a scratch or damage to the magnetic disk 13 even when the flying head slider 14 collides against the surface of the magnetic disk 13. Such collision of the flying head slider 14 may be caused, for example, when the HDD 10 alone is dropped, and when a user drops a portable personal computer or personal digital assistant in which the HDD 10 is assembled. A violent behavior of the actuator 17 may also cause the collision of the flying head slider 14 to the magnetic disk 13 when a trouble is found in the control circuit to the actuator 17. If the control circuit loses control of the actuator 17, the carriage arm 16 may powerfully hit against a stop or else, so that the rebounded carriage arm 16 forces the flying head slider 14 at its tip end to collide against the surface of the magnetic disk 13. The chamfered vertices or slants 51 are expected to improve the shock resistance of the HDD 10 up to 1,000 G approximately. Without the chamfered vertices or slants 51, the HDD 10 normally shows the shock resistance under 700 G approximately.

Figure 4A:
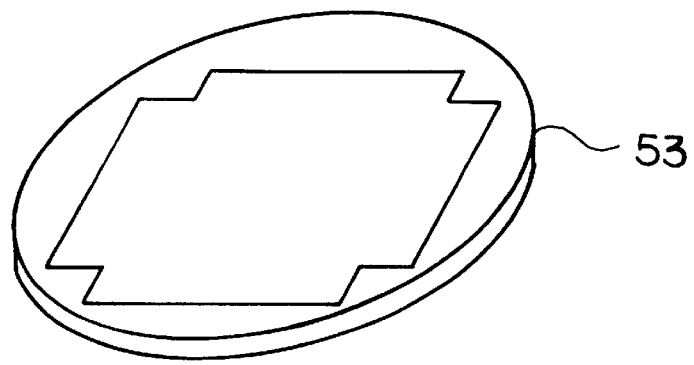
FIGS. 4A–4C schematically illustrate the method of producing the flying head slider.

The description will briefly be made on the method of producing the aforementioned flying head slider 14. As shown in FIG. 4A, rows of transducer elements 35 are formed on the surface of the $Al_2O_3$ layer overlaid on the $Al_2O_3$—TiC wafer 53. Each of the transducer elements 35 is assigned to a block area which will be cut out into a single flying head slider 14. For example, 100×100=10,000 flying head sliders 14 can be obtained from a wafer of 5 inches diameter. The formed transducer elements 35 are then covered with a protection layer of $Al_2O_3$.

Figure 4B:
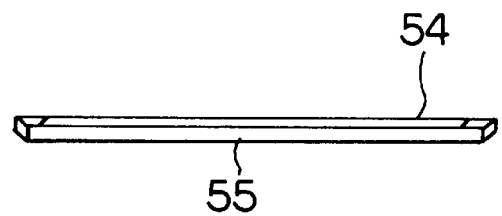
Figure 4C:
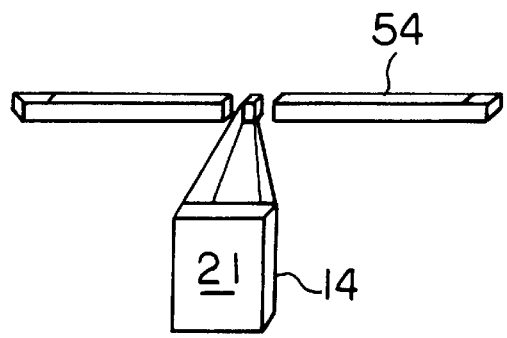

As shown in FIG. 4B, a wafer bar 54 is thereafter cut out from the wafer 53. A row of transducer elements 35 are separated out of the rows of the transducer elements 35. Accordingly, the transducer elements 35 arranged in a row are maintained on the wafer bar 54. A section 55 can be exposed at the wafer bar 54. The exposed section 55 is shaped into the bottom surface 21 of the flying head slider 14 by using a conventional process such as a photolithography. After the formation of the bottom surface 21 of the flying head slider 14 has been completed, an individual flying head slider 14 is cut off from the wafer bar 54, as shown in FIG. 4C. The bottom surface 21 of the flying head slider 14 is thereafter subjected to a lapping process.

Figure 5:
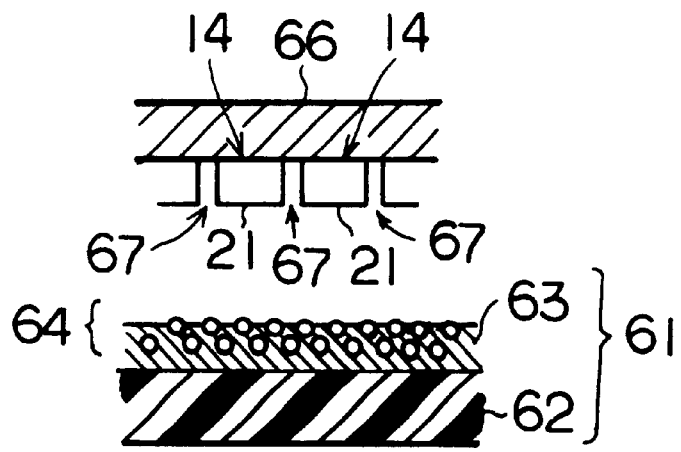
FIG. 5 is a sectional view schematically illustrating the structure of a diamond lap faceplate.

Next, the description will be made on the method of lapping in detail. The lapping process employs a diamond lap faceplate 61 as shown in FIG. 5, for example. The diamond lap faceplate 61 comprises a diamond lap tape 63 lined with an elastic plate 62 such as a rubber plate, for example. According to the diamond lap faceplate 61 of this type, a diamond abrasive layer 64 over the diamond lap tape 63 can be deformed with the assistance of the elasticity of the elastic plate 62 and the diamond lap tape 63. The diamond lap tape 63 may employ diamond grains of diameter or size in a region between 0.05 $\mu$m and 5 $\mu$m approximately.

Before the individual flying head sliders 14 are separated, the wafer bar 54 is adhered to a support bar or plate 66 so as to face the shaped bottom surface 21 open. When the cutting process is then conducted, gaps are defined between the adjacent flying head sliders 14, respectively, as shown in FIG. 5. The flying head sliders 14 are still held on the support plate 66. When the support plate 66 is opposed to the diamond lap faceplate 61, the bottom surfaces 21 of the flying head sliders 14 faces the surface of the diamond abrasive layer 64. The bottom surfaces 21 are then urged against the diamond abrasive layer 64. The load of urging may be set in a range between 200 gf and 2,000 gf, for example.

Figure 6:
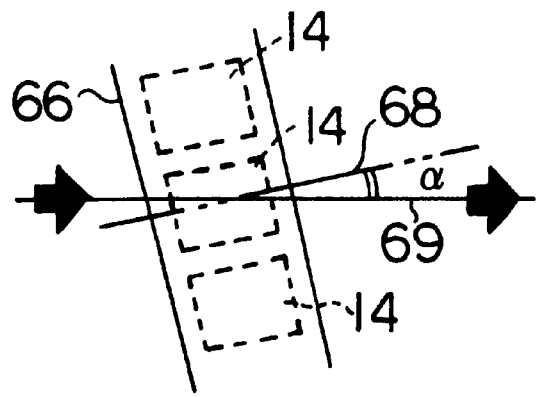
FIG. 6 is a plan view illustrating the method of lapping.

The flying head sliders 14 are rubbed on the surface of the diamond lap tape 63. Specifically, the support plate 66, which holds the individual flying head sliders 14, is slid on the diamond lap tape 63 with a stroke of 20 mm to 200 mm. As shown in FIG. 6, an inclined angle $\alpha$ of 10° to 70° may be kept between the direction 69 of stroke and the centerline 68 extending on the bottom surface 21 of the flying head slider 14 from the upstream end to the downstream end. When the flying head slider 14 is rubbed on the diamond lap tape 63 in this way, the diamond abrasive layer 64 is deformed due to the elasticity of the elastic plate 62 and the diamond lap tape 63 so as to contact with the periphery of the bottom surface 21, namely, the level surface 22. The elastic deformation of the diamond abrasive layer 64 serves to chamfer the vertices 52 at the level surface 22 spaced far behind the front rail 23 and the rear rails 25a, 25b.

Figure 7:
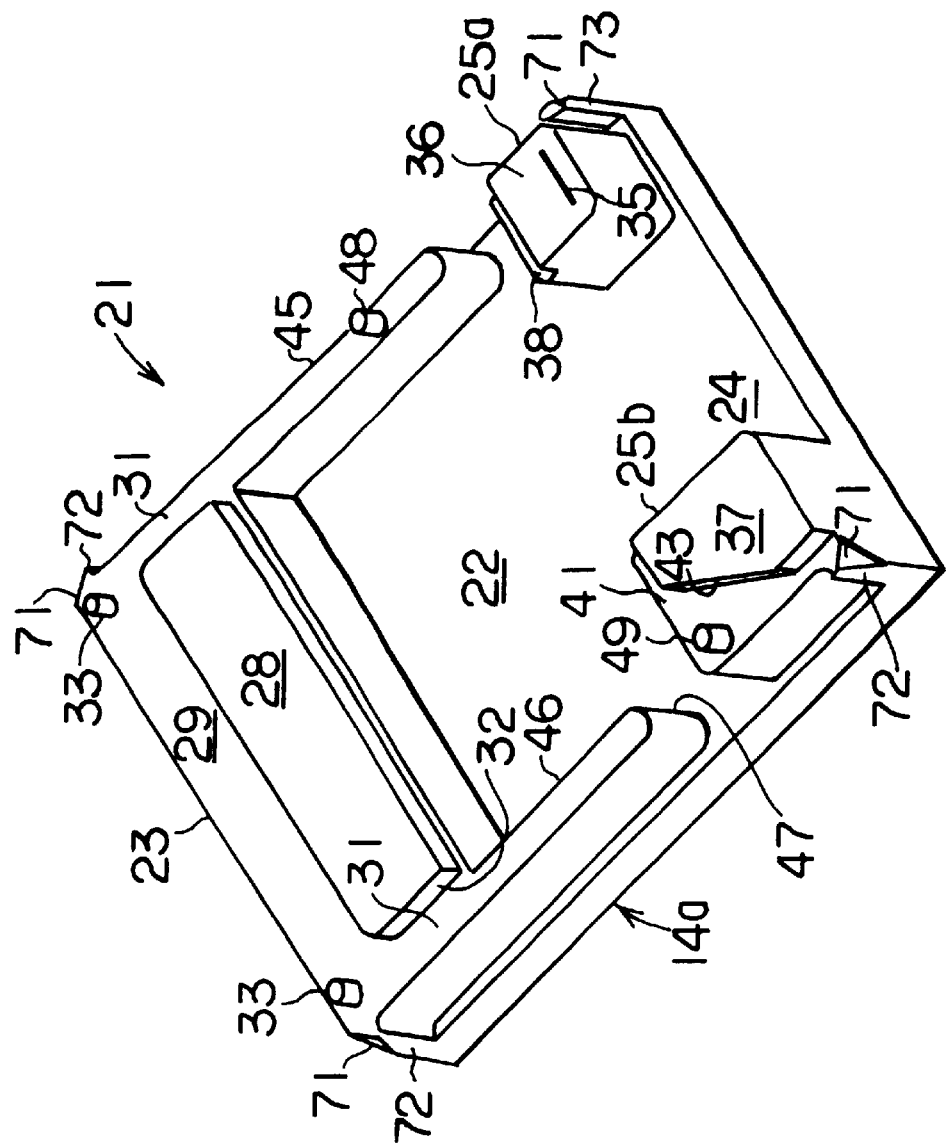
FIG. 7 is an enlarged perspective view illustrating a flying head slider according to a second embodiment of the present invention.

FIG. 7 illustrates the flying head slider 14a according to a second embodiment of the present invention. The flying head slider 14a comprises chamfered vertices or slants 71 at corners of the bottom surface 21. The slants 71 are located closer to the surface of the magnetic disk 13 than the level surface 22 when the flying head slider 14 is opposed to the magnetic disk 13. It should be noted that the structures or components identical to those of the aforementioned first embodiment are identified by the same reference numerals in this second embodiment. Duplicate description may accordingly be omitted.

As shown in FIG. 7, columns 72, 73 are formed to stand on the level surface 22 at four corners of the bottom surface 21. The slants 71 are formed on the vertices of the columns 72, 73 by using the aforementioned method of lapping in the same manner as the flying head slider 14 of the first embodiment. Since the columns 72, 73 define longer edges, it is possible to form the slants 71 along the longer edges, so that the slants 71 can be formed larger than the slants 51 of the first embodiment. Accordingly, the shock resistance can greatly be improved in an electronic device including the flying head slider 14a of this type. As is apparent from FIG. 7, the column 72 may be integrated with the front rail 23 at its opposite ends in the lateral direction of the slider 14, and may be integrated with the rear rail 25b at one of opposite ends in the lateral direction of the slider 14.

The columns 72, 73 may define tip ends aligned with the front stepped surfaces 29, 38, 41 of the front and rear rails 23, 25a, 25b. If the height of the columns 72, 73 is aligned with the top surfaces of the front and rear rails 23, 25a, 25b in this manner, the columns 72, 73 can be formed without introducing any additional process. The columns 72, 73 can be formed at the same time in the process of forming the front stepped surfaces 29, 38, 41. Moreover, the chamfer made on the column 72, 73 fails to cause the variation in the area of the front air bearing surface 28 as well as the first and second rear air bearing surfaces 36, 37, so that it is possible to design the flying height of the flying head slider 14a without considering the effect of the chamfer.

The above-described slants 51, 71 of the present invention may be applied not only to flying head sliders such as the aforementioned flying head sliders 14, 14a but also to the other types of head sliders such as a contact head slider. The aforementioned transducer elements can be replaced with the other types of read elements and/or write elements. In addition, any lap tape other than the aforementioned diamond lap tape 63 can be employed to form the slants 51, 71.

What is claimed is:

1. A head slider for a recording disk, comprising:
   a slider body defining a polygonal bottom surface;
   at least one rail swelling from a level surface of the bottom surface;
   an air bearing surface defined on the rail and connected to a top surface of the rail through a step, said step extending in a lateral direction of the slider body generally perpendicular to an air stream along a surface of the disk, at an upstream end of the air bearing surface with respect to said air stream; and
   a chamfered vertex defined at a corner of the rail on a contour, separated from a contour of the air bearing surface.

2. The head slider according to claim 1, wherein the chamfered vertex is formed on a column standing adjacent the rail on the level surface at a corner of the bottom surface.

3. The head slider according to claim 2, wherein the column includes a tip end aligned with the top surface of the rail.

4. The head slider according to claim 3, wherein the rail is a front rail extending in the lateral direction of the slider body near an upstream end of the slider body.

5. The head slider according to claim 4, wherein the column is integrated with the front rail at its opposite ends in the lateral direction.

6. The head slider according to claim 3, wherein the rail is one of a pair of rear rails spaced apart in the lateral direction of the slider body near a downstream end of the slider body for defining a passage of air stream therebetween.

7. The head slider according to claim 6, wherein the column is integrated with the rear rail at one of opposite ends in the lateral direction.

8. The head slider according to claim 1, wherein the rail is one of a pair of rear rails spaced apart in the lateral direction of the slider body near a downstream end of the slider body for defining a passage of air stream therebetween.

9. The head slider according to claim 1, wherein the rail is a front rail extending in the lateral direction of the slider body near an upstream end of the slider body.

10. The head slider according to claim 1, wherein said air bearing surface is not subjected to chamfering.

11. A recording disk drive comprising a head slider which includes:
    a slider body defining a polygonal bottom surface;
    at least a rail swelling from a level surface of the bottom surface;
    an air bearing surface defined on the rail and connected to a top surface of the rail through a step, said step extending in a lateral direction of the slider body generally perpendicular to an air stream along a surface of the disk, at an upstream end of the air bearing surface with respect to said air stream; and
    a chamfered vertex defined at a corner of the rail on a contour separated from a contour of the air bearing surface.

12. The recording disk drive according to claim 11, wherein the chamfered vertex is formed on a column standing adjacent the rail on the level surface at a corner of the bottom surface.

13. The recording disk drive according to claim 12, wherein the column includes a tip end aligned with the top surface of the rail.

14. The recording disk drive according to claim 11, wherein said air bearing surface is not subjected to chamfering.

* * * * *